United States Patent
Cowelchuk et al.

(10) Patent No.: US 7,005,091 B2
(45) Date of Patent: Feb. 28, 2006

(54) INTEGRATED TRIM PLATE WITH A THERMOPLASTIC COVER

(75) Inventors: Glenn Cowelchuk, Chesterfield Township, MI (US); Steven M. Christian, Williamsburg, IA (US); Todd DePue, Brighton, MI (US); David J. Cauvin, Royal Oak, MI (US)

(73) Assignee: Lear Corporation, Southfield, MI (US)

( * ) Notice: Subject to any disclaimer, the term of this patent is extended or adjusted under 35 U.S.C. 154(b) by 387 days.

(21) Appl. No.: 10/248,306

(22) Filed: Jan. 7, 2003

(65) Prior Publication Data

US 2004/0130051 A1 Jul. 8, 2004

(51) Int. Cl.
 *B29C 39/20* (2006.01)
 *B29C 44/06* (2006.01)
 *B29C 44/12* (2006.01)
(52) U.S. Cl. .................. 264/46.5; 264/46.4; 264/255; 264/259; 264/275; 264/278
(58) Field of Classification Search ............... 264/46.4, 264/255, 275, 278, 46.5, 259
See application file for complete search history.

(56) References Cited

U.S. PATENT DOCUMENTS

| | | | | |
|---|---|---|---|---|
| 3,112,163 A | * | 11/1963 | Alderfer | 264/46.4 |
| 4,544,126 A | * | 10/1985 | Melchert | 249/83 |
| 4,810,452 A | * | 3/1989 | Taillefert et al. | 264/247 |
| 4,814,036 A | * | 3/1989 | Hatch | 156/245 |
| 5,389,317 A | | 2/1995 | Grimmer | |
| 5,411,688 A | * | 5/1995 | Morrison et al. | 264/45.4 |
| 5,439,630 A | | 8/1995 | Gallagher et al. | |
| 5,571,597 A | | 11/1996 | Gallagher et al. | |
| 5,762,853 A | | 6/1998 | Harris et al. | |
| 5,888,662 A | | 3/1999 | Gorsuch et al. | |
| 6,017,617 A | | 1/2000 | Gardner, Jr. | |
| 6,432,543 B1 | | 8/2002 | Harrison et al. | |
| 2002/0001722 A1 | | 1/2002 | Harrison et al. | |

* cited by examiner

*Primary Examiner*—Allan R. Kuhns
(74) *Attorney, Agent, or Firm*—Earl LaFontaine

(57) ABSTRACT

A method for forming an integrated trim plate in a single processing step. An appliqué section is reversibly securing to the lower section of a mold. A layer of thermoplastic covering is applied onto and over the appliqué section and lower section of the mold. A layer of foam is then injected between the thermoplastic covering and a substrate used to secure the integrated trim plate within a structure such as an automobile frame. The appliqué section may be magnetically secured to the lower section of the mold or may be physically secured within a forming section of the lower section.

19 Claims, 5 Drawing Sheets

INTEGRATED TRIM PLATE WITH A THERMOPLASTIC COVER

BACKGROUND OF INVENTION

The present invention relates generally to trim plates, and more particularly to an integrated trim plate with a thermoplastic cover.

A recent trend in the automobile industry has been the development of various non-fabric automotive trim components. Automotive interior trim articles such as instrument panels, door panels, armrests, headrests, floor consoles, knee bolsters, and glove compartment doors conventionally have been constructed by applying a soft decorative covering over a rigid substrate mountable in an automobile vehicular body, with a cellular polyurethane padding interposed between the decorative covering and rigid substrate. A predetermined texture and color is usually provided to the decorative covering in an effort to simulate the appearance and feel of authentic leather.

These decorative coverings suffer from a number of potential drawbacks. For example, current processes are both complex and time-intensive and can lead to increased manufacturing costs. Further, these components suffer from non-ideal fit and finish.

It is therefore an object of the present invention to provide an integrated trim plate that is capable of integrating many potential components. It is another object to provide a process for making trim plates having high craftsmanship, good fit and good finish in a single processing step. The trim plates may then be coupled within a wide variety of potential systems, including within an instrument panel and door trim.

SUMMARY OF INVENTION

In accordance with the above objects to provide a method for applying a spray thermoplastic cover over an appliqué section that is subsequently formed into an integrated trim plate by introducing a foamed section between the thermoplastic cover and the hard plastic or metal substrate.

In one aspect of the present invention, the appliqué section is placed within a formed section of a tool. The thermoplastic cover is sprayed over the appliqué section and tool to adhere the appliqué section to the cover. The formed section is designed to hold the appliqué section in place during the spraying process.

In another aspect of the present invention, the thermoplastic cover is applied to an appliqué section that is magnetically affixed to a tool. The entire tool may comprise the magnet, or portions of the tool may comprise the magnet.

Integrated trim plates formed according to the preferred embodiments described above are easily formed in one processing step, thereby decreasing manufacturing costs. In addition, the integrated trim parts offer good fit and finishes.

Other objects and advantages of the present invention will become apparent upon considering the following detailed description and appended claims, and upon reference to the accompanying drawings.

DETAILED DESCRIPTION

Figure 1:
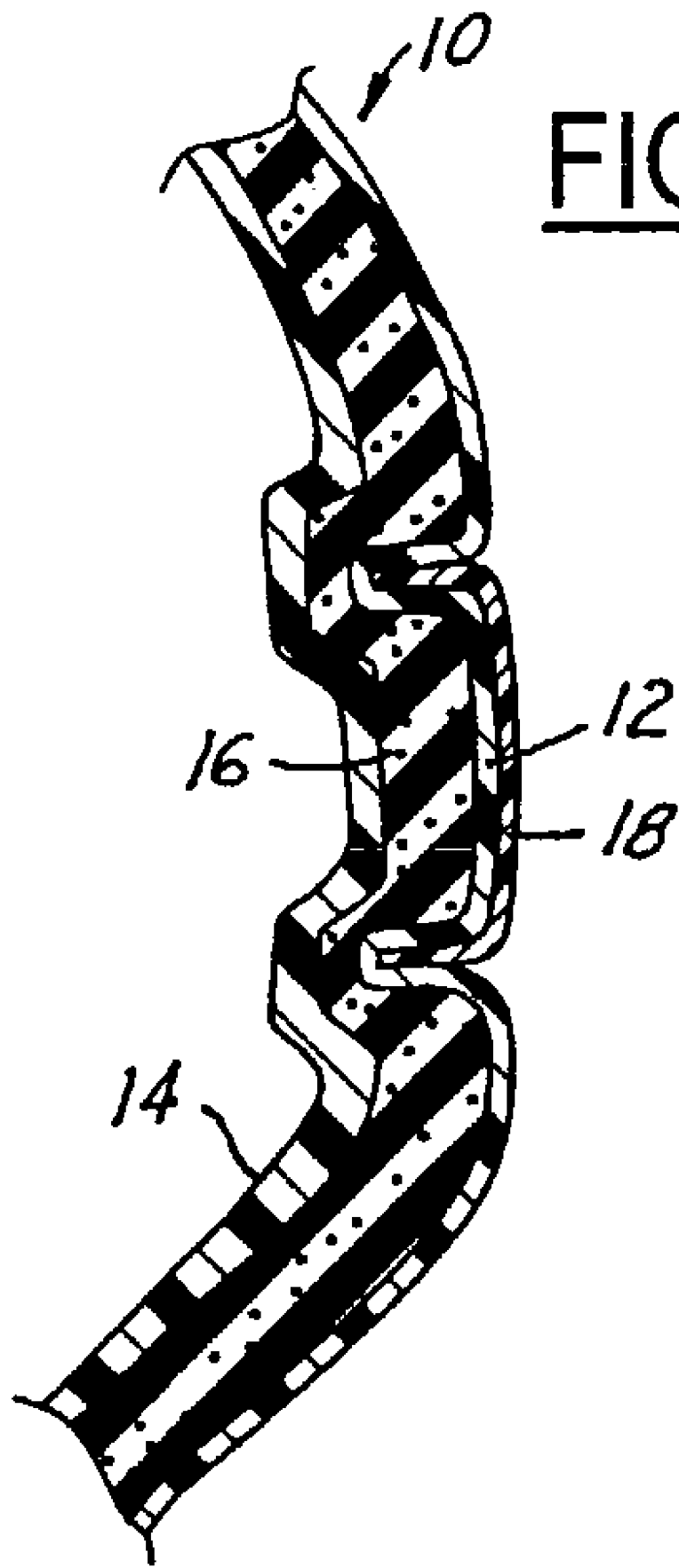
FIG. 1 is a section view of an integrated trim component according to one preferred embodiment of the present invention.

Referring now to the drawing, FIG. 1 illustrates a typical article that can be made in accordance with the present invention in the form of an interior trim component 10, or integrated trim component, for an automobile. The trim component comprises an outer thermoplastic cover 12, a substrate 14 sometimes referred to as an insert, and a shaped foam cushion 16 between the cover 12 and substrate 14. A simulated leather appliqué section 18 is also coupled within a portion of the outer thermoplastic cover 12.

The thermoplastic cover 12 can be made of any suitable thermoplastic material that is aesthetically pleasing and feels good to the touch. Preferably, the thermoplastic cover is a thin skin of polyurethane. However, other possible thermoplastic cover 12 materials include but are not limited to thermoplastic polyolefins (TPO), thermoplastic elastomers, polyvinylchloride (PVC) and polyesters (PE).

The substrate material 14 can be made of a material that is of sufficient strength for handling or fastening the component 10 to a support structure such as an automobile frame or door. The material must also be compatible with the material of the cover 12 and of the foam cushion 16. The substrate material 14 is typically made of metal or plastic. Typical examples of metal include steel, aluminum, magnesium, as well as various alloys well known in the art. Typical examples of plastic include but are not limited to structural thermoplastic materials such as polycarbonate, acrylonitrile-butadiene-styrene (ABS), or thermoplastic polyolefins (TPO).

The foam structure 16 is well known to those of skill in the art to provide a soft feel to the trim component 10 and fill out the trim component 10 while contributing little in terms of overall cost and weight. The foam is preferably semi-rigid when completely reacted. Typically, the foam structure 16 is constructed of polyurethane foams. However, other foams may be used as well, including but not limited to polyurea-formaldehyde foams, polyether foams, and polyisocyanurate foams. One preferred foaming structure 16 utilized in the present invention is 21635R, a polyurethane foam commercially available from BASF.

Figure 2:
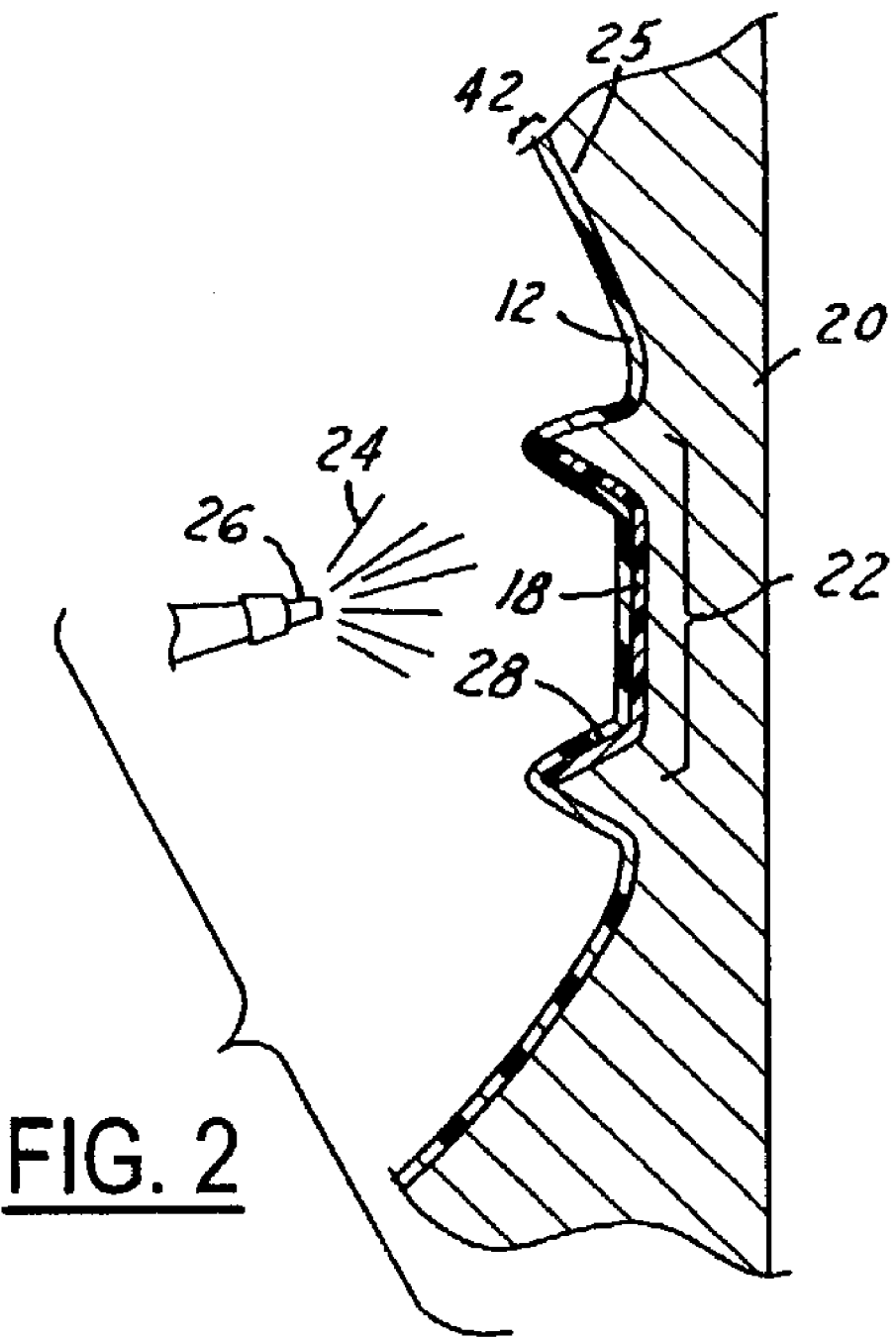
FIG. 2 is a section view of the process for forming the thermoplastic cover on the appliqué section of FIG. 1 according to one preferred embodiment of the present invention.
Figure 3:
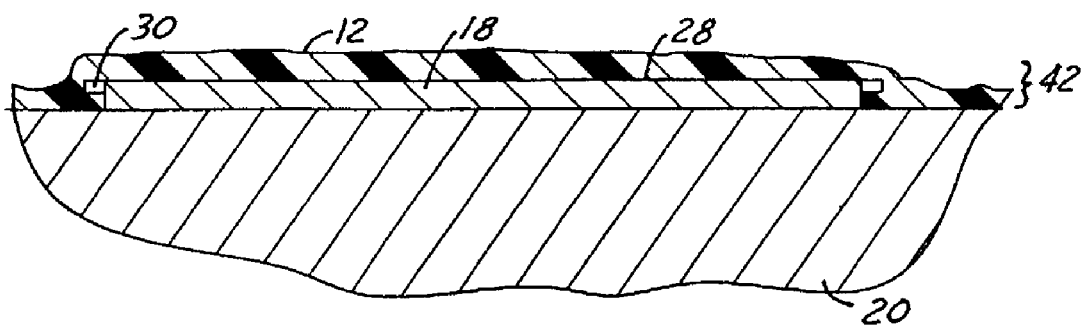
FIG. 3 is a section view of the process for forming the thermoplastic cover on the appliqué section of FIG. 1 according to another preferred embodiment of the present invention.
Figure 4:
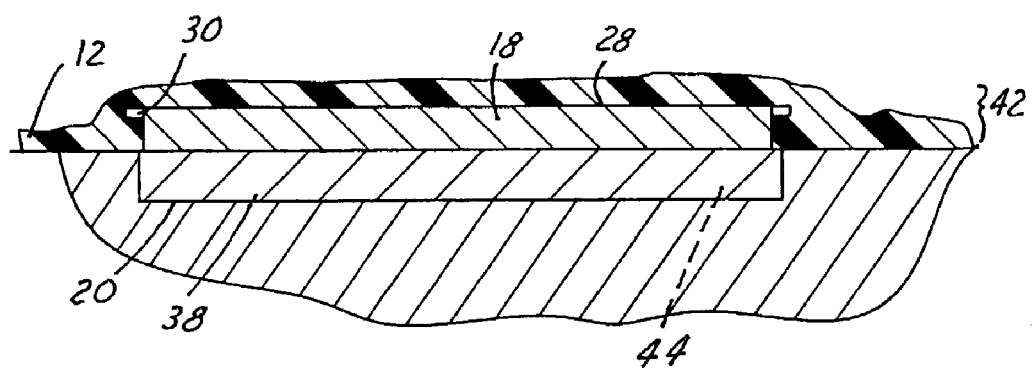
FIG. 4 is a section view of the process for forming the thermoplastic cover on the appliqué section of FIG. 1 according to another preferred embodiment of the present invention preferred embodiment of the present invention.

FIGS. 2–4 illustrates a sectional view three preferred processes for sealing the thermoplastic cover 12 to the appliqué section 18 to form a thermoplastic sealed appliqué section 42.

Referring now to FIG. 2, the process for forming the thermoplastic sealed appliqué section 42 begins by first coupling the appliqué section 18 within a corresponding formed section 22 within a tool 20. As shown below in FIG. 5, the tool 20 is the bottom portion of the mold 56 used to form the integrated trim plate 10. The tool 20 is preferably the lower section of a mold, and thus tool 20 and lower section 20 are used interchangeably herein.

The formed section 22 is shaped to correspond to the outer finished surface 19 of the appliqué section 18. The formed section 22 is also designed to hold the appliqué section 18 firmly to the tool 20 during subsequent application of the thermoplastic cover 12.

Alternatively, as shown in FIG. 3, the appliqué section 18 is metallic and is coupled to the tool 20 that has the opposite magnetism of the appliqué section 18. The tool 20 itself therefore must be formed of a magnetic material. Preferably, the tool 20 is formed of nickel. Thus, the appliqué section 18 sticks to the tool 20 without the need for a special formed section as in FIG. 2. In this way, the tool 20 does not have to be manufactured with specially designed forming sections 22 that correspond to the shape of the appliqué section 18 desired for each vehicle's varying interior trim components.

In FIG. 4, a magnet 38 is coupled within a cutout portion 44 of the tool 20, rather than the entire tool 20 being magnetized as in FIG. 3. The location, size, and shape of the magnet 38 can vary greatly depending upon numerous factors. These factors include but are not limited to the shape of the appliqué section 18, the amount of magnetic adherence required between the appliqué section 18 and the magnet 38 to ensure that the appliqué section 18 is firmly held in place during subsequent steps, and manufacturing costs gleaned to couple the magnet 38 within a portion of the tool 20. Thus, the magnet 38 could be contained within a cutout portion 44 as shown in FIG. 3, or could form a shell (not shown) around the entire tool 20.

In all of the embodiments described above in FIGS. 2–4, a liquid resin 24 is subsequently sprayed through a fluid nozzle 26 onto the surface 25 of the tool 20 and onto the backside 28 of the appliqué section 18 to a uniform thickness. The liquid resin 24 crosslinks or otherwise reacts to form the outer thermoplastic cover 12 that is substantially sealed to the appliqué section 18, therein forming a thermoplastic sealed appliqué section 42. The thickness of the outer thermoplastic cover 12 is between 0.5 and 2.0 mils, and more preferably between 0.8 and 1.2 mils.

Preferably, the liquid resin 24 is a two-component polyurethane material formed by crosslinking an aromatic or aliphatic polyol material and an isocyanate crosslinker material. One preferred two-component urethane is Elastolit MS0690R, manufactured by BASF Corporation.

To aid in sealing the thermoplastic cover 12 to the appliqué section 18, one or more tabs 30 (best shown in FIGS. 3 and 4) may be added to the appliqué section 18 along its exterior surface. The liquid resin 24 migrates around the tabs 30 during the spray application process.

Figure 5:
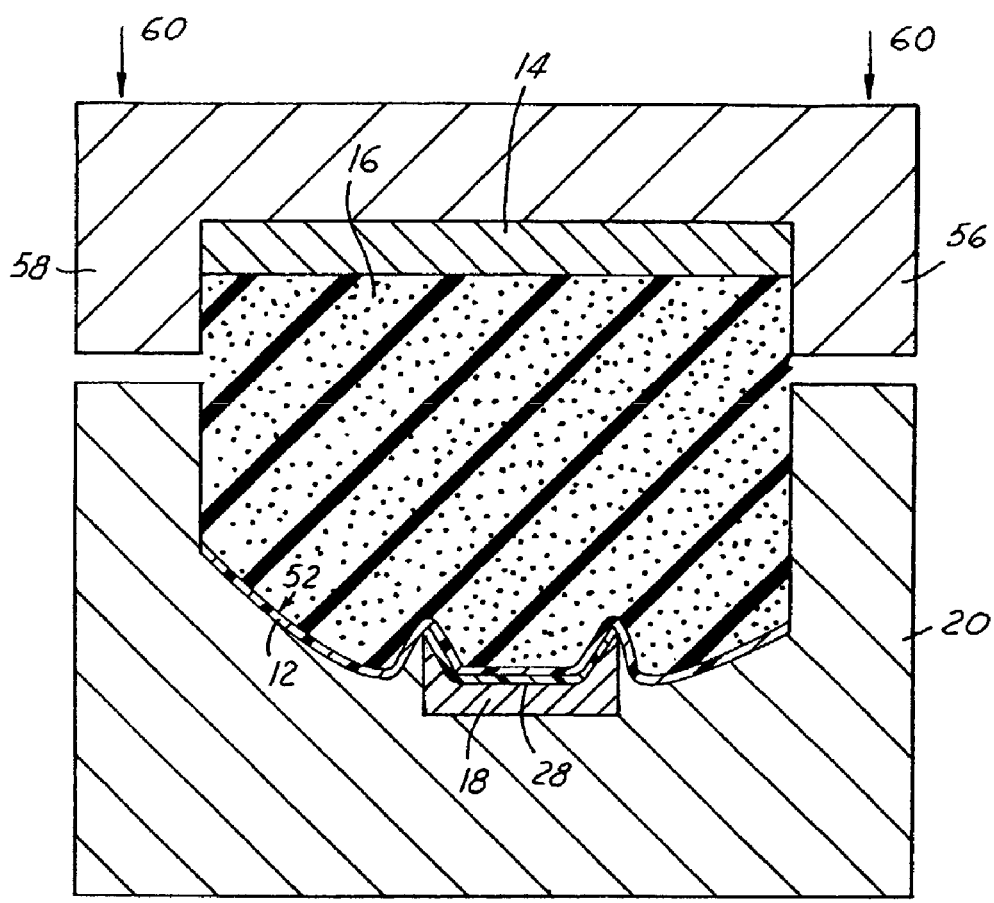
FIG. 5 is a section view of the process for forming the interior trim component of from FIGS. 1–4.

FIG. 5 describes a preferred process for forming the integrated trim plate 10 from the thermoplastic sealed appliqué section 42 made in FIGS. 2–4.

As shown in FIG. 5, a coating of foam material 16 is sprayed or otherwise applied onto substantially the entire back surface 52 of the thermoplastic cover 12 in a substantially uniform manner. The mold 56 is closed such that the upper portion 58 of the mold is sealed to the tool 20 and such that the substrate 14 is located within the mold cavity in spaced relationship to the thermoplastic cover 12. The closed mold 56 is clamped shut as indicated by force arrows 60 while the foam material 16 reacts to fill the mold cavity between the cover 12 and the substrate 14. The foam material 16 is preferably a semi-rigid type when the chemical reaction is complete. The mold 56 is opened and the integrated trim plate 10 is removed.

The integrated trim plates 10 formed in the present invention may be utilized in a wide variety of applications. Ideally, these trim plates are used as instrument panels, door panels, armrests, headrests, floor consoles, knee bolsters, and glove compartment doors.

The trim plates 10 formed according to the present invention offer many advantages over the prior art. For example, the present invention allows integration of various components, which decreased costs. Also, the present invention is easily manufactured with high craftsmanship. The appliqué section 18 is integrated into the thermoplastic cover with a good fit and finish.

While the invention has been described in terms of preferred embodiments, it will be understood, of course, that the invention is not limited thereto since modifications may be made by those skilled in the art, particularly in light of the foregoing teachings.

What is claimed is:

1. A method for forming an integrated trim component within a mold having an upper section and a lower section, the mold having a mold cavity defined by said upper section and lower section; the method comprising:
   reversibly coupling an appliqué section to an outer surface of the lower section of the mold;
   coupling at least one tab to an exterior surface of said appliqué section, said at least one tab aiding in sealing a layer of a two-component liquid resin to said appliqué section when said layer is cured;
   introducing said layer of a two-component liquid resin at a first thickness to one side of said appliqué section and to said outer surface;
   curing said layer to said appliqué section to form a thermoplastic sealed appliqué section;
   coupling a substrate to the upper section surface of the mold;
   introducing a foam material onto said thermoplastic sealed appliqué section; and
   closing said mold such that said upper section seals to said lower section such that said substrate is located within the mold cavity in spaced relationship to said thermoplastic sealed appliqué section; wherein said foam material reacts to fill the mold cavity with a foam structure between said substrate and said thermoplastic sealed appliqué section.

2. The method of claim 1, wherein reversibly coupling an appliqué section comprises:
   reversibly securing an appliqué section within a formed section of a lower section of a mold, said formed section being contoured to substantially match said appliqué section.

3. The method of claim 1, wherein reversibly coupling an appliqué section comprises:
   providing an appliqué section having a first magnetic polarity; and
   reversibly coupling said appliqué section to the lower section, wherein said lower section is formed of a material having a second magnetic polarity, said second magnetic polarity being opposite of said first magnetic polarity.

4. The method of claim 1, wherein reversibly coupling an appliqué section comprises:
   providing an appliqué section having a first magnetic polarity; and
   reversibly coupling said appliqué section to a magnet retained within a cutout portion of the lower section.

5. The method of claim 1, wherein introducing a layer of a two-component liquid resin at a first thickness to one side of said appliqué section and to said outer surface comprises introducing a two component urethane material at a first thickness to one side of said appliqué section and to said outer surface.

6. The method of claim 1, wherein introducing a layer of a two-component liquid resin at a first thickness to one side of said appliqué section and to said outer surface comprises wherein introducing a layer of a two-component liquid resin at a first thickness to one side of said appliqué section and to said outer surface, said first thickness being between approximately 0.5 and 2.0 mils.

7. The method of claim 1, introducing a layer of a two-component liquid resin at a first thickness to one side of said appliqué section and to said outer surface comprises wherein introducing a layer of a two-component liquid resin at a first thickness to one side of said appliqué section and to said outer surface, said first thickness being between approximately 0.8 and 1.2 mils.

8. The method of claim 1, wherein introducing a foam material onto said thermoplastic sealed appliqué section comprises introducing a polyurethane foam material onto said thermoplastic sealed appliqué section.

9. A method for forming a thermoplastic sealed appliqué section comprising:
reversibly securing an appliqué section within a formed section of a lower section of a mold, said formed section being contoured to substantially match said appliqué section;
coupling at least one tab to an exterior surface of said appliqué section, said at least one tab aiding in sealing a layer of a two-component liquid resin to said appliqué section when said layer is cured;
introducing said layer of a two-component liquid resin at a first thickness to one side of said appliqué section and to an outer surface of said lower section; and
curing said layer to said appliqué section to form a thermoplastic-sealed appliqué.

10. The method of claim 9, wherein introducing a layer of a two-component liquid resin at a first thickness to one side of said appliqué section and to an outer surface of said lower section comprises introducing a two component urethane material at a first thickness to one side of said appliqué section and to an outer surface of said lower section.

11. The method of claim 9, wherein introducing a layer of a two-component liquid resin at a first thickness to one side of said appliqué section and to an outer surface of said lower section comprises wherein introducing a layer of a two-component liquid resin at a first thickness to one side of said appliqué section and to an outer surface of said lower section, said first thickness being between approximately 0.5 and 2.0 mils.

12. The method of claim 9, wherein introducing a layer of a two-component liquid resin at a first thickness to one side of said appliqué section and to an outer surface of said lower section comprises wherein introducing a layer of a two-component liquid resin at a first thickness to one side of said appliqué section and to an outer surface of said lower section, said first thickness being between approximately 0.8 and 1.2 mils.

13. A method for forming a thermoplastic sealed appliqué section comprising:
magnetically securing an appliqué section to a lower section of a mold;
coupling at least one tab to an exterior surface of said appliqué section, said at least one tab aiding in seating a layer of a two-component liquid resin to said appliqué section when said layer is cured;
introducing said layer of a two-component liquid resin at a first thickness to one side of said appliqué section and to an outer surface of said lower section; and
curing said layer to said appliqué section.

14. The method of claim 13, wherein magnetically coupling an appliqué section comprises:
providing an appliqué section having a first magnetic polarity; and
magnetically coupling said appliqué section to a lower section of a mold, wherein said lower section is formed of a material having a second magnetic polarity, said second magnetic polarity being opposite of said first magnetic polarity.

15. The method of claim 13, wherein magnetically coupling an appliqué section comprises:
providing an appliqué section having a first magnetic polarity; and
magnetically coupling said appliqué section to a magnet retained within a cutout portion of a lower section of a mold.

16. The method of claim 13, wherein introducing a layer of a two-component liquid resin at a first thickness to one side of said appliqué section and to an outer surface of said lower section comprises introducing a two component urethane material at a first thickness to one side of said appliqué section and to an outer surface of said lower section.

17. The method of claim 13, wherein introducing a layer of a two-component liquid resin at a first thickness to one side of said appliqué section and to an outer surface of said lower section comprises introducing a layer of a two-component liquid resin at a first thickness to one side of said appliqué section and to an outer surface of said lower section, said first thickness being between approximately 0.5 and 2.0 mils.

18. The method of claim 13, wherein introducing a layer of a two-component liquid resin at a first thickness to one side of said appliqué section and to an outer surface of said lower section comprises introducing a layer of a two-component liquid resin at a first thickness to one side of said appliqué section and to an outer surface of said lower section, said first thickness being between approximately 0.8 and 1.2 mils.

19. The method of claim 13, wherein magnetically securing an appliqué section to a lower section of a mold comprises magnetically securing an appliqué section to a lower section of a mold, said lower section comprising a nickel material.

* * * * *

UNITED STATES PATENT AND TRADEMARK OFFICE
CERTIFICATE OF CORRECTION

PATENT NO. : 7,005,091 B2  Page 1 of 1
APPLICATION NO. : 10/248306
DATED : February 28, 2006
INVENTOR(S) : Glenn Cowelchuk et al.

It is certified that error appears in the above-identified patent and that said Letters Patent is hereby corrected as shown below:

Column 5,
Line 4, should read as follows: -- introducing a layer of a two-component liquid resin --

Column 5,
Line 11, should read as follows: -- introducing a layer of a two-component liquid resin --

Column 5,
Line 43, should read as follows: -- section comprises introducing a layer of a two- --

Column 5,
Line 51, should read as follows: -- section comprises introducing a layer of a two- --

Column 6,
Line 4, should read as follows: -- applique section, said at least one tab aiding in sealing --

Signed and Sealed this

Fifteenth Day of August, 2006

JON W. DUDAS
*Director of the United States Patent and Trademark Office*